US011704640B2

(12) United States Patent
Todd et al.

(10) Patent No.: US 11,704,640 B2
(45) Date of Patent: *Jul. 18, 2023

(54) AUTOMATIC INVOICE NOTIFICATION

(71) Applicant: Block, Inc., San Francisco, CA (US)

(72) Inventors: Matthew Allen Todd, Oakland, CA (US); Mathew Wilson, San Francisco, CA (US); Douglas Justin Shearer, Alameda, CA (US)

(73) Assignee: Block, Inc., Oakland, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 16/680,177

(22) Filed: Nov. 11, 2019

(65) Prior Publication Data

US 2020/0082368 A1 Mar. 12, 2020

Related U.S. Application Data

(63) Continuation of application No. 14/701,402, filed on Apr. 30, 2015, now Pat. No. 10,475,011.

(51) Int. Cl.
*G06Q 20/14* (2012.01)
*G06Q 20/20* (2012.01)
*G06Q 30/04* (2012.01)

(52) U.S. Cl.
CPC ............ *G06Q 20/14* (2013.01); *G06Q 20/20* (2013.01); *G06Q 20/202* (2013.01); *G06Q 30/04* (2013.01)

(58) Field of Classification Search
None
See application file for complete search history.

(56) References Cited

U.S. PATENT DOCUMENTS

| 6,081,790 | A | * | 6/2000 | Rosen | G06Q 30/04 |
| | | | | | 705/40 |
| 9,984,359 | B1 | * | 5/2018 | Patnaik | G06Q 20/14 |
| 10,055,769 | B1 | | 8/2018 | Todd et al. | |
| 10,475,011 | B1 | | 11/2019 | Todd et al. | |
| 2001/0001148 | A1 | | 5/2001 | Martin et al. | |
| 2003/0078884 | A1 | | 4/2003 | Bauman | |
| 2004/0107141 | A1 | | 6/2004 | Conkel et al. | |

(Continued)

OTHER PUBLICATIONS

Non-Final Office Action dated Nov. 20, 2015, for U.S. Appl. No. 14/701,402, of Todd, M.A., et al., filed Apr. 30, 2015.

(Continued)

*Primary Examiner* — Scott A Zare
(74) *Attorney, Agent, or Firm* — Lee & Hayes, P.C.

(57) ABSTRACT

Introduced here is a technology for automatic notification of an invoice for a customer based on identification of a customer identifier included in transaction data received from a point-of-sale (POS) system of a particular merchant ("the invoice technology"). The notification can include a promotion to provide an incentive to the customer to pay the invoice. The notification can be presented on a display of the POS system. Alternatively, the notification can be presented in a receipt for the transaction conducted at the POS system, where that receipt can be transmitted for display at a user device of the customer. For example, the receipt can be in the form of an email message or a text message. Upon notification of the invoice, the customer can submit a payment for that invoice ("invoice payment") in exchange for the promotion.

20 Claims, 9 Drawing Sheets

(56) References Cited

U.S. PATENT DOCUMENTS

| | | | |
|---|---|---|---|
| 2006/0059088 A1 | 3/2006 | Krikorian et al. | |
| 2007/0033070 A1 | 2/2007 | Beck et al. | |
| 2008/0147550 A1 | 6/2008 | Morsillo et al. | |
| 2008/0147552 A1 | 6/2008 | Morsillo et al. | |
| 2009/0090783 A1 | 4/2009 | Killian et al. | |
| 2009/0132414 A1 | 5/2009 | Philliou et al. | |
| 2010/0106582 A1 | 4/2010 | Etheredge et al. | |
| 2013/0085939 A1* | 4/2013 | Colak | G06Q 40/02 705/44 |
| 2013/0238455 A1 | 9/2013 | Laracey | |
| 2014/0122264 A1 | 5/2014 | Gebhart et al. | |
| 2014/0129445 A1 | 5/2014 | Yang | |
| 2014/0172537 A1 | 6/2014 | Weigman | |
| 2015/0019428 A1 | 1/2015 | Priebatsch | |
| 2015/0088676 A1 | 3/2015 | Elliott et al. | |
| 2015/0142545 A1* | 5/2015 | Ceribelli | G06Q 30/0224 705/14.23 |
| 2015/0317681 A1* | 11/2015 | Zamer | G06Q 30/08 705/14.58 |

OTHER PUBLICATIONS

Final Office Action dated Sep. 6, 2016, for U.S. Appl. No. 14/701,402, of Todd, M.A., et al., filed Apr. 30, 2015.

Advisory Action dated Dec. 6, 2016, for U.S. Appl. No. 14/701,402, of Todd, M.A., et al., filed Apr. 30, 2015.

Non-Final Office Action dated Dec. 15, 2016, for U.S. Appl. No. 14/701,370, of Todd, M.A., et al., filed Apr. 30, 2015.

Non-Final Office Action dated Jan. 30, 2017, for U.S. Appl. No. 14/701,402, of Todd, M.A., et al., filed Apr. 30, 2015.

Final Office Action dated Jun. 12, 2017, for U.S. Appl. No. 14/701,402, of Todd, M.A., et al., filed Apr. 30, 2015.

Final Office Action dated Jul. 11, 2017, for U.S. Appl. No. 14/701,370, of Todd, M.A., et al., filed Apr. 30, 2015.

Advisory Action dated Sep. 11, 2017, for U.S. Appl. No. 14/701,402, of Todd, M.A., et al., filed Apr. 30, 2015.

Advisory Action dated Nov. 9, 2017, for U.S. Appl. No. 14/701,370, of Todd, M.A., et al., filed Apr. 30, 2015.

Non-Final Office Action dated Nov. 30, 2017, for U.S. Appl. No. 14/701,370, of Todd, M.A., et al., filed Apr. 30, 2015.

Notice of Allowance dated Apr. 12, 2018, for U.S. Appl. No. 14/701,370 of Todd, M.A., et al., filed Apr. 30, 2015.

Notice of Allowance dated May 3, 2018, for U.S. Appl. No. 14/701,370 of Todd, M.A., et al., filed Apr. 30, 2015.

Notice of Allowance dated Jul. 3, 2019, for U.S. Appl. No. 14/701,402 of Todd, M.A., et al., filed Apr. 30, 2015.

* cited by examiner

600

| Customer ID1 | Customer ID2 | Customer ID3 | First Name | Last Name | Billing Address |
|---|---|---|---|---|---|
| Invoice X | Johndoe@gmail.com | 571-727-1000 | John | Doe | 654 ABC St., New York, NY 10086 |
| Invoice Y | Janedoe@gmail.com | -- | Jane | Doe | -- |
| -- | Sally@gmail.com | 415-764-2980 | Sally | Smith | 30 Rock St., New York, NY 10086 |
| -- | johnj@gmail.com | 650-764-2980 | John | James | 123 Sesame St., Palo Alto, CA 94304 |
| Invoice Z | alex@gmail.com | 310-888-1000 | Alex | Kirkson | 123 Easy St., Mountain View, CA 94041 |

602

| Customer ID2 | Customer ID4 (e.g., card number) | Issuer | Expiration | Billing Address |
|---|---|---|---|---|
| johnj@gmail.com | XXXX-XXXX-XXXX-XXXX | Bank of America | 1/31/2016 | 123 Sesame St., Palo Alto, CA 94304 |
| Janedoe@gmail.com | XXXX-XXXX-XXXX-XXXX | Wells Fargo | 5/31/2017 | 100 PQ st, Seattle, WA 98101 |
| JohnDoe@gmail.com | XXXX-XXXX-XXXX-XXXX | Chase | 6/1/2015 | 654 ABC St., New York, NY 10086 |
| Sally@gmail.com | -- | -- | -- | 30 Rock St., New York, NY 10086 |
| alex@gmail.com | XXXX-XXXX-XXXX-XXXX | Wells Fargo | 1/31/2016 | 123 Easy St., Mountain View, CA 94041 |

*FIG. 6*

AUTOMATIC INVOICE NOTIFICATION

RELATED APPLICATIONS

This Application claims priority to U.S. patent application Ser. No. 14/701,402, filed Apr. 30, 2015, the entire contents of which are incorporated herein by reference which is incorporated herein by reference.

BACKGROUND

An invoice is a commercial document, issued by a merchant to a customer in a sales transaction, typically indicating a product sold or service rendered, a quantity, an agreed transaction amount for the product or service, and payment terms that specify, among other things, when payment is due. Invoices are beneficial to a merchant's business as they provide financial flexibility for customers (i.e., delayed payments), thereby incentivizing the customers to engage in transactions with the merchant. However, unpaid invoices, which inherently represent unrealized income for the merchant, are recorded as financial liabilities (e.g., account payables). Accordingly, the sooner an invoice is paid, the more financially healthy is the business.

BRIEF DESCRIPTION OF THE DRAWINGS

Embodiments of the invoice technology will be described and explained through the use of the accompanying drawings in which:

FIG. 6 illustrates example database tables that can be utilized with the disclosed technology;

DETAILED DESCRIPTION

Figure 1:
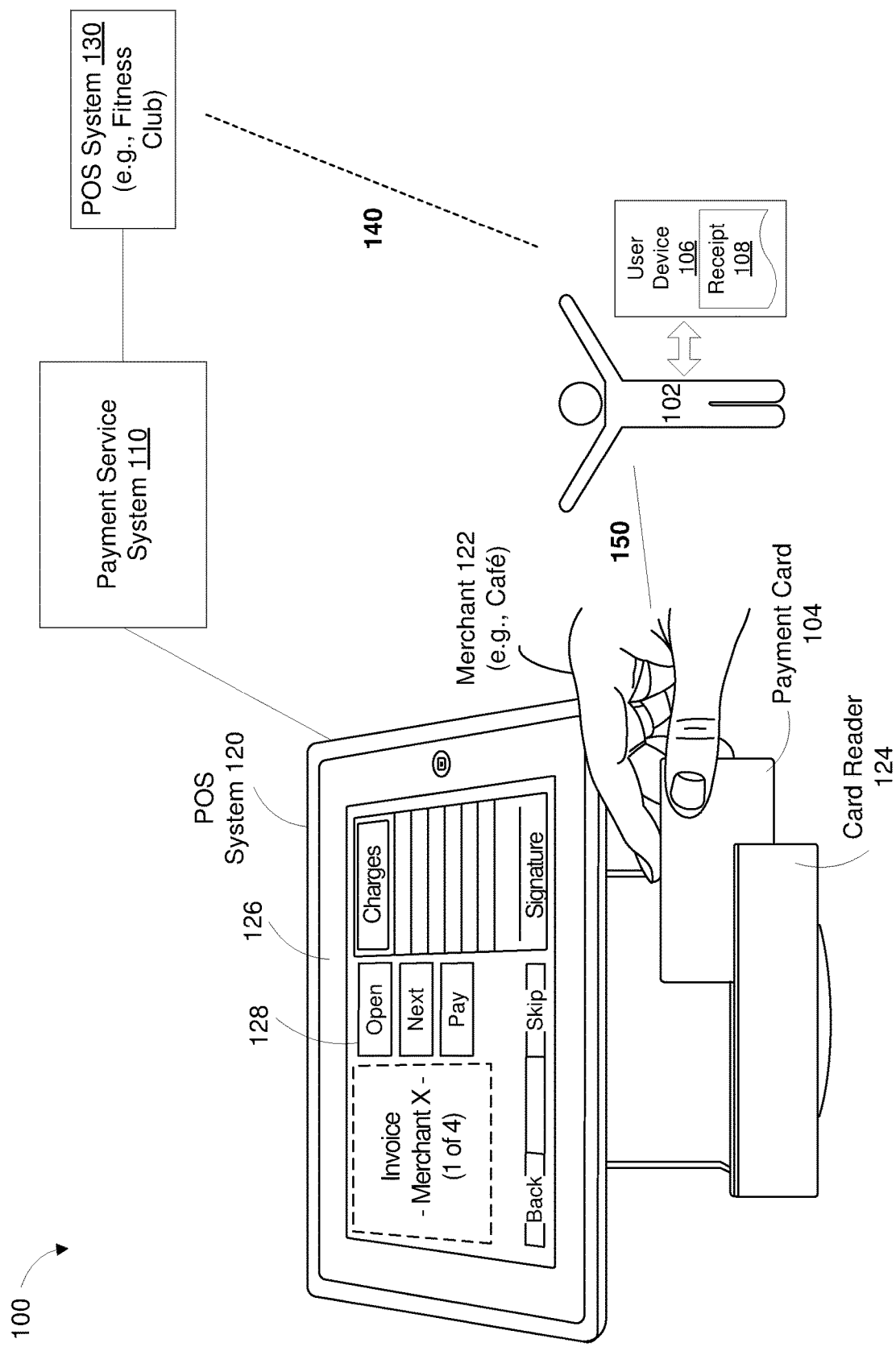
FIG. 1 illustrates schematically a technique for automatic identification of an invoice.

Introduced here is technology for automatically identifying and notifying a customer of a pending (unpaid) invoice, based on identification of a customer identifier in transaction data received from a point-of-sale (POS) system of a merchant ("the invoice technology"). In particular, the notification can be presented on a display of the POS system of the merchant (hereinafter, "POS merchant"). Alternatively, the notification can be presented in a receipt for the transaction conducted at the POS system, where that receipt can be transmitted for display at a user device of the customer. For example, the receipt can be in the form of an email message or a text message. The notification can include a promotional offer (hereinafter, "promotion") to provide an incentive to the customer to pay the invoice, such as, for example, a discount or a free product or service provided by the POS merchant. Upon notification of the invoice, the customer can submit a payment for that invoice ("invoice payment") to redeem the promotion. As a result, the financial liability associated with the invoice can be resolved faster for the merchant of the invoice ("invoice merchant").

Note that the POS merchant who operates the POS system discussed above can be either the invoice merchant or a different, second merchant. In the case where the POS merchant is a merchant other than the invoice merchant, the POS merchant who operates the POS system can receive a compensation from the invoice merchant for utilizing the invoice technology (thereby enabling the invoice merchant to receive the invoice payment via more than one avenue). In some instances, the POS system can receive the compensation from a third-party payment service that executes the invoice technology; for example, the third-party payment service is employed by the invoice merchant to collect invoice payments.

Note also that the term "customer identifier" used here refers to any identifier that can be used to identify the customer, directly or indirectly, including, for example, a card number of the customer's payment card (e.g., credit card or debit card), an email address of the customer, a phone number of the customer, a biometric identifier of the customer, a geographical location (e.g., geographic location data such as an address, geographical coordinates, etc.) associated with the customer, etc. As used here, the term "biometric identifier" refers to any biometric information, or data, that can be provided by a biometric object of, or belonging to, the customer. An example of a biometric identifier is a fingerprint or retina pattern. Examples of a biometric object can include a finger, a hand, an iris, or a face, among others.

In some embodiments, the invoice technology also involves automatic identification and generation of a list of merchants (e.g., including the POS merchant) for inclusion in an invoice provided by the invoice merchant. Note the invoice discussed here may not relate to the transaction discussed above. The list of merchants includes one or more merchants at which the customer can pay the invoice. The list of merchants can be generated based on, for example, a spending trend of the customer, past transactions of the customer, or a geographical location of the customer. For example, where the customer has a spending trend of shopping at boutique stores, the list of merchants can include boutique clothing stores and boutique jewelry stores as recommended places where the invoice can be paid. In another example, where the customer has conducted transactions regularly with Coffee Shop X and Restaurant Y, the list of merchants can include these merchants. In yet another example, where the customer's residential address is included in the invoice, the list of merchants can include merchants that are geographically located within a specified distance of that address. The specified distance can be configured, or specified, by the invoice merchant, the customer, a system operator associated with the invoice technology, or any combination thereof.

As will be discussed further below, the invoice technology involves a network-based payment service system (PSS) that processes, on behalf of various merchants, customer transactions occurring at POS systems of the merchants. The PSS can include an invoice generation module and an invoice management module. The invoice generation module can be configured to receive a request to generate an invoice for a customer, identify a list of one or more merchants as recommended options for where the invoice can be paid, and generate the invoice including the list of one or more merchants. In some instances, the invoice can include one or more promotions corresponding to the one or more merchants to provide an incentive to the customer to pay the invoice at one of the recommended merchants. Based on the list of merchants included in the invoice, a customer can decide, for example, to visit a new coffee shop near her house so that she can take advantage of the invoice payment capability and receive, for example, a free coffee (based on a promotion, e.g., "Pay your invoice at Bee Café and get a free coffee").

The invoice management module of the PSS can be configured to receive transaction data for a transaction conducted between a customer and a merchant at a POS system, identify any pending (unpaid) invoice(s) of the customer based on an association between any invoice(s) and a customer identifier included in the received transaction data, and generate an invoice payment invitation to notify the customer and/or the merchant about the one or more invoices. The payment invoice invitation can include a promotion to provide an incentive to the customer to pay a particular invoice. As discussed above, the payment invoice invitation can be displayed (or output in some other manner) by the POS system or by a user device belonging to the customer.

In some instances, in response to the payment invoice invitation, the customer can submit, at the POS system, an invoice payment for a particular invoice of the pending invoice(s) identified for the customer. The POS system can transmit invoice payment information about that payment to the invoice management module. In some instances, the customer can pay the invoice at a later time (e.g., at home) using a user device belonging to the customer, such as a conventional personal computer or tablet computer. Whenever an invoice payment is received for a particular invoice, the invoice management module can transmit a message to a corresponding invoice merchant notifying that merchant of the payment.

In some instances, the promotion discussed above (e.g., the promotion associated with the list of recommended merchants or the promotion included in the invoice payment invitation) can be for a product or service offered by a POS merchant to provide an incentive to the customer to pay the invoice of another merchant (i.e., the invoice merchant). For example, the promotion can be "Pay invoice and receive a free coffee here on your next visit." In exchange for providing this promotion, the POS merchant can receive a compensation amount from the invoice merchant (e.g., 1% of invoice amount) for helping to collect the invoice payment from the customer. Such compensation amount can be transferred by the PSS from an account associated with the invoice merchant to an account associated with the POS merchant, upon the POS merchant (and/or the PSS) receiving the invoice payment from the customer.

In other instances when the invoice is from the POS merchant (i.e., the POS merchant is the invoice merchant), the POS merchant can still offer the promotion to provide an incentive to its own customers to pay invoices. For example, the POS merchant can provide an incentive to a customer to pay an invoice before the due date. In another example, the POS merchant can provide an incentive to the customer to pay a past-due invoice.

Among other benefits, the invoice technology enables an invoice merchant to obtain faster (and/or overdue) invoice payments through any POS system that is associated with the PSS, including the invoice merchant's own POS system(s) and/or other merchants' POS system(s). Furthermore, because identification and notification of an invoice is automatic whenever a customer conducts a transaction with a POS system associated with the PSS, which recognizes the customer (and corresponding invoice) based on an identifier, the invoice technology removes the customer's burden of having to remember which merchant and/or which invoice still requires payment. Additionally, the invoice technology enables the customer to submit an invoice payment not only at any POS system associated with the PSS, but also at a later time (e.g., at home) using a user device of the customer.

In this specification, note that the term "sale," as in point-of-sale (POS) or sales system used throughout this specification, can refer to any type of payment-oriented transaction, including a lease or rental for example, and is not limited to an actual purchase. Accordingly, the invoice technology can be implemented to collect details about, for example, an equipment rental transaction to generate an invoice on behalf of the provider.

Further, in this specification, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

Additionally, references to "an embodiment", "one embodiment" or the like, mean that the particular feature, function, structure or characteristic being described is included in at least one embodiment of the invoice technology introduced here. Occurrences of such phrases in the specification do not necessarily all refer to the same embodiment. On the other hand, the embodiments referred to also are not necessarily mutually exclusive.

FIG. 1 illustrates schematically a technique 100 for automatic identification of an invoice. As illustrated in the embodiments of FIG. 1, the technique 100 involves communication between a computer system 110 of a payment service ("payment service system 110" or "PSS 110"), a point-of-sale (POS) computer system 120 ("POS system 120") of a merchant 122 (i.e., a POS merchant), and a POS computer system 130 ("POS system 130") of another merchant. An illustrative use case in reference to FIG. 1 is now discussed to facilitate understanding of the technique 100. The illustrative use case includes a transaction 140 and a transaction 150, conducted by a user 102 with two different merchants. The transaction 140 will be discussed in further details in the description of FIG. 2.

In the transaction 150, a user 102 makes a purchase with a merchant 122 at the POS system 120. For example, the user 102 purchases a coffee and a breakfast sandwich at a "Bee Café" (i.e., merchant 122). The user 102 can present a payment card 104 to the merchant 122 to pay for the purchase. The payment card 104 can be a conventional credit card or debit card, a proxy card that is associated with multiple financial accounts, or an electronic card (e.g., a Europay, MasterCard, and Visa (EMV) card, an electronic card with Bluetooth Low Energy® (BLE), etc.) The merchant 122 (e.g., an employee) can swipe the payment card 104 through a card reader 124 of the POS system 120, where the card reader 124 reads payment card data from the payment card 104. The payment card data can include, for example, a name, a card number, an expiration date, a card verification code, among others.

The term "swipe" as used here refers to any manner of triggering a physical card reader to read a physical card, such as passing a card through a magnetic stripe reader, a smartcard reader, an optical code reader, radio frequency identification (RFID) reader, etc. In some embodiments, the payment card 104 is associated with a payment object that is physically used, in place of the payment card 104, to pay for the purchase. In such embodiments, the card reader 124 can be an object identifier capable of reading data from the payment object, where a "swipe" refers to any manner of placing the payment object in a position suitable to be identified by the object identifier. For example, the object identifier is a biometric finger scanner configured to obtain data (e.g., fingerprint) related to a finger (i.e., a payment object) placed on the scanner, where the data is sufficient to enable initiation of payment authorization for the transaction. Furthermore, the term "sale," as in point-of-sale (POS) or sales system, refers to any type of payment-oriented transaction, including a lease or rental for example, and is not limited to an actual purchase.

The POS system 120, via the card reader 124, obtains the payment card data from the payment card 104 and transmits, via a wired or wireless communications network, a message to the PSS 110. The message can include transaction data associated with the second transaction 150. The transaction data can include a transaction amount, the payment card data (such as the card number of the payment card 104), item-level data associated with the items purchased in the transaction 150, among others. The PSS 110, upon receiving the message from the POS system 120, can analyze the transaction data included in the message to identify a customer involved in the transaction 150 (e.g., the user 102).

In some embodiments, the PSS 110 can identify the user 102 as the customer by searching the transaction data for a customer identifier associated with the customer. The customer identifier can be the card number of the payment card 104, the customer's email address, the customer's phone number, or any combination thereof stored by the PSS 110, as discussed above. Upon identifying the customer identifier, the PSS 110 can identify any outstanding invoice(s) owed by the user 102 based on stored association data related to the customer identifier. In particular, the PSS 110 can access a database associated with the PSS 110 (e.g., via a Structured Query Language (SQL) query) to retrieve the association data. The association data specifies associations between customer identifiers and corresponding invoices. The invoices can include, for example, an invoice generated for another transaction with the merchant 122 (at the POS system 120 or another POS system associated with the merchant 122. The invoices can also include, for example, the invoice generated for the first transaction 140, which will be discussed further below in reference to FIG. 2.

In one example, the PSS 110 identifies the invoice by finding a match between the card number (i.e., customer identifier) of the payment card 104 used in the second transaction 150 and a card number of a particular payment card stored in association with an invoice in the database. In another example, the PSS 110 identifies the invoice by finding a match between a particular email address (i.e., customer identifier) provided by the user 102 in the transaction 150 and an email address stored in association with the invoice in the database. The particular email address can be provided at the POS system 120, for example, when the user 102 requests for an electronic receipt of the transaction 150. In yet another example, the PSS 110 indirectly identifies the invoice by first finding a match between the card number of the payment card 104 and a card number of a particular payment card stored in association with an email address in the database. The PSS 110 then proceeds to find a second match between that email address and a phone number stored in association with an invoice in the database, and identifies that invoice to belong to the user 102. Alternatively, as another example, the PSS 110 can proceed to find the invoice based on the invoice's association with the email address, which is stored in association with the payment card 104. Examples of the association data are illustrated in the database tables 600, 602 of FIG. 6.

Responsive to identification of a particular invoice, the PSS 110 can generate an invoice payment invitation for the user 102. The invoice payment invitation operates as a notification to indicate that one or more invoices have been identified for the user 102 based on the customer identifier associated with the user 102. The invoice payment invitation can include a promotion to provide an incentive to the user 102 to pay the invoice. For example, the promotion includes a discount for a transaction item associated with the merchant 122 (e.g., "Pay an invoice to receive 20% off your next meal!").

The invoice payment invitation can be generated at a display 126 of the POS system 120. For example, the PSS 110 transmits the invoice payment invitation to an application executing at the POS system 120, and presents the invoice payment invitation on the display 126. The application (e.g., a payment service application) can receive the invoice payment invitation via an Application Program Interface (API) associated with the PSS 110. Note that while one invoice payment invitation is discussed here for sake of simplicity, additional invoice payment invitations may be generated based on the number of invoices identified for the user 102. In such instances, the merchant 122 and/or the user 192, for example, can look through all of the invoice payment invitations to view all of the invoices by interacting with another action button on the display 126 (e.g., "Next"). The merchant 122 and/or the user 102 can also decide not to view the invoice payment invitation(s) by interacting with another action button on the display 126 (e.g., "Skip").

In some embodiments, in generating the invoice payment notification, the PSS 110 first determines whether the invoice identified is associated with the merchant 122 or a second, different merchant. In an event that the invoice is associated with a second merchant that is different from the merchant 122, the PSS 110 generates the invoice payment invitation to include limited information about the invoice (e.g., invoice amount or simply invoice merchant name). In this scenario, the merchant 122 can simply notify the user 102 of the existence of the invoice and/or the invoice amount, without revealing any other invoice details, such as item-level transaction data about the product or service purchased, transaction date, billing address, among others.

In some embodiments, based on the determination that the invoice is not associated with the merchant 122, the PSS 110 can transmit a confirmation message to the POS system 120 for presentation at the display 126. The confirmation message can prompt a passcode from the user 102 to access the invoice details associated with the invoice identified. For example, the merchant 122 can interact with an action button 128 (e.g., "Open"), which upon activation triggers presentation of the confirmation message prompting the passcode from the user 102. The merchant 122 can then rotate, or turn, the display 126 toward the user 102 to allow input of the passcode. Responsive to input of a (correct) passcode, the invoice payment invitation can be fully presented with the invoice details included for viewing by the user 102. In this way, the merchant 122 is prevented from viewing the invoice details, thereby protecting the privacy of the user 102.

The passcode inputted by the user 102 into the POS system 120 can be transmitted to the PSS 110 for verification. In some embodiments, the passcode can be preconfigured, or specified, by the user 102 with the PSS 110. For example, the user 102 signs up for invoice service provided by the PSS 110. In some embodiments, the passcode can be any identifying piece of information about the user 102 that is stored by the PSS 110 from a transaction and/or interaction (e.g., creation of user profile with the PSS 110). In one example, the passcode is the birthday month and date of the user 102 (e.g., 0315). In another example, the passcode is a customer identifier (e.g., phone number).

In an event that the PSS 110 determines the invoice is associated with the merchant 122, the PSS 110 generates the invoice payment invitation to include the invoice details. In some embodiments, the merchant 122 can view those invoice details by interacting with the action button 128. In such embodiments, the action button 128 can trigger display of a prompt requesting a merchant passcode. Responsive to input of a (correct) merchant passcode, the invoice payment invitation can be fully presented with the invoice details included. In this way, the privacy of the user 102 is not violated by the merchant 122, which already possesses knowledge of the invoice; furthermore, the privacy of the user 102 is protected from unauthorized access (i.e., by a non-employee of the merchant 122).

In some embodiments, the invoice payment invitation can be generated and transmitted for display at a user device 106 belonging to the user 102. In particular, the invoice payment invitation can be included in a receipt 108 generated for the transaction 150 conducted at the POS system 120. For example, the user 102 receives notification of the identified invoice in the receipt for the transaction 150 after completion of the transaction at the POS system 120 (e.g., payment card authorization and/or signature). In some embodiments, the receipt can include a link associated with the invoice payment notification where that link can be activated to pay the invoice. The link can direct the user 102 to a network resource associated with the PSS 110 for making the payment. Activation of the link can be performed in a web browser executing on the user device 106. The PSS 110 can generate this link as part of the invoice payment invitation that is included in the receipt sent to the user device 106.

In some embodiments, the PSS 110 generates and transmits the receipt to the user device 106 using an email address submitted by the user 102 in the second transaction 150. The email address can be submitted, for example, in response to a request presented at the display 126 asking whether the user 102 wishes to receive an electronic receipt for the transaction 150. In such embodiments, the receipt 108 can be an email message that includes the invoice payment invitation. Note that the email address can also be the customer identifier used to identify the one or more invoices for the user 102 as discussed above.

In some embodiments, the PSS 110 generates and transmits the receipt to the user device 106 using a phone number submitted by the user 102. The phone number can be submitted, for example, in response to the request asking whether the user 102 wishes to receive an electronic receipt. In such embodiments, the receipt 108 can be a text message that includes the invoice payment invitation. Note that the phone number can also be the customer identifier used to identify the one or more invoices for the user 102 as discussed above.

The user device 106 can be any computing device capable of receiving user input as well as transmitting and/or receiving data via a wired or wireless communications network. The user device 106 can be a conventional computer system (e.g., a desktop or a laptop computer) or a mobile device having computer functionality (e.g., a tablet device, a mobile telephone, or a smart-phone). An example of a user device 106 is a mobile computing device such as a tablet computer (e.g., an Apple® iPad®) or a smartphone (e.g., an Apple® iPhone®).

Upon receiving the invoice payment invitation (e.g., either via the POS system 120 or the user device 106), the user 102 can submit a payment for the invoice. For example, at the POS system 120, the user 102 interacts with an action button (e.g., "Pay") on the display 126 to submit the payment. In another example, the user 102 activates the link included in the receipt (as discussed above). In some embodiments, activation of the link triggers a web browser executing on the user device 106 to generate a web page at which the user 102 can submit the invoice payment. In other embodiments, activation of the link results in an authorization of the payment card 104 to be charged for the invoice payment.

In some embodiments, the PSS 110 receives an indication of the link activation by the user 102 using the user device 106. The indication of the activation can include invoice payment data, or information, that indicates the payment is submitted for a particular invoice. In some embodiments, the invoice payment data can include the payment card data associated with the payment card 104 charged with the invoice payment. Upon receiving the indication of the activation, the PSS 110 can trigger funds to be transferred from an account associated with the user 102 to the invoice merchant associated with the paid invoice. In some embodiments, the PSS 110 communicates with a credit card network to transfer the funds. In other embodiments, the PSS 110 communicates with a debit card network to transfer the funds. In some embodiments, the PSS 110 also transmits a confirmation message of the invoice payment to the invoice merchant.

Figure 2:
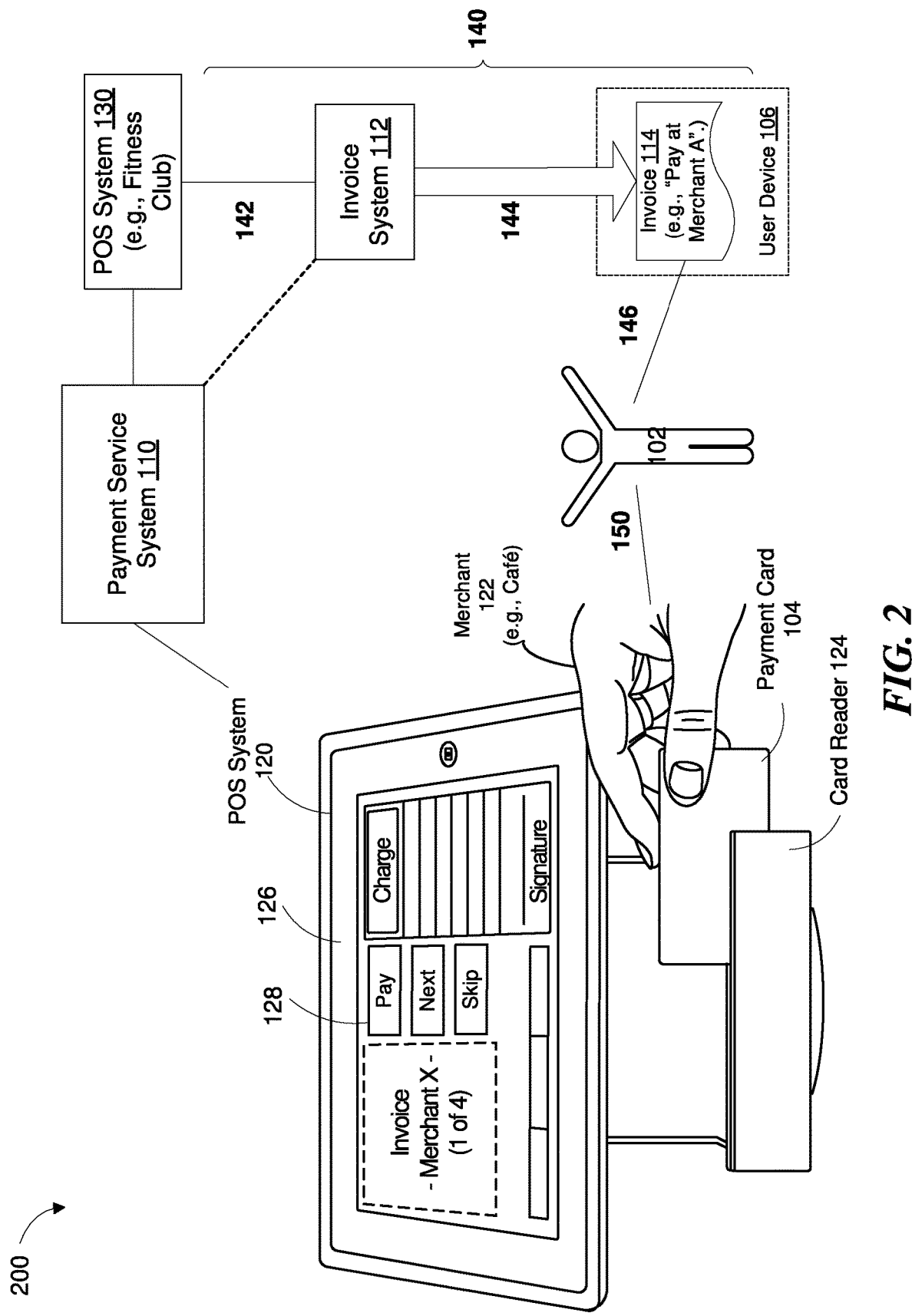
FIG. 2 illustrates schematically a technique of generating an invoice and identifying one or more merchants at which to pay the invoice.

FIG. 2 illustrates schematically a technique 200 of generating an invoice and identifying one or more merchants at which to pay the invoice. An illustrative use case is discussed in reference to the transaction 140 of FIG. 2 for ease of understanding of the technique 200. The transaction 140 can take place before the transaction 150 discussed in FIG. 1. For example, the transaction 140 can occur a few hours or a few days before transaction 150.

In the transaction 140, the user 102 makes a purchase of a product or service with a merchant at the POS system 130. The merchant can be a different merchant from the merchant 122. For example, the merchant is a fitness club merchant offering a gym membership service, whereas the merchant 122 is a café merchant. In the illustrative use case, the transaction 140 includes a business agreement that allows the user 102 to defer payment through use of an invoice (e.g., invoice 114) provided by the merchant (i.e., invoice merchant), as opposed to immediate payment.

In particular, the user 102 provides information to the invoice merchant for generating the invoice, where that information is inputted into the POS system 130. The information can include a customer name, a customer address (e.g., billing address and/or mailing address), and transaction data about the transaction 140, such as item-level data, transaction amount, among others. In some embodiments, the transaction data can also include one or more customer identifiers of the user 102. In one example, the customer identifier is an email address of the user 102 (e.g., provided by the user 102 to receive the invoice in an email message). In another example, the customer identifier is a phone number of the user 102 (e.g., provided by the user 102 to receive the invoice in a text message). In yet another example, the customer identifier is a biometric identifier (e.g., a fingerprint inputted to the POS system 130 by the user 102 as part of an authorization process).

In some embodiments, the POS system 130 can generate the invoice for the transaction 140 using the information that includes the transaction data. Alternatively, in some embodiments, the POS system 130 transmits that information to the PSS 110 in a request to generate the invoice for the transaction 140 for the user 102. In such embodiments, the POS system 130 can also transmit a card number of the payment card 104 as another customer identifier for use in generating the invoice. The payment card 104 can be already on file with the invoice merchant (e.g., a customer profile stored at the POS system 130), where the payment card 104 has been used in a past transaction conducted with the merchant and/or at the POS system 130; the merchant, however, may not have authorization to charge the payment card 104 for any subsequent transaction, such as the transaction 140.

Upon receiving the request from the POS system 130, the PSS 110 communicates with an invoice system 112, which generates an invoice 114 for the transaction 140. The invoice system 112 can be an application executing on the PSS 110, where the application can be software, hardware, or a combination thereof. In some embodiments, the invoice system 112 and the PSS 110 can be implemented in the same computing device, such as a smart phone or a tablet computer, so that the standalone computing device can be the sole host and practice the various techniques disclosed herein. In some embodiments, the PSS 110 is the invoice system 112. In other embodiments, the invoice system 112 can be a separate entity from the PSS 110. In some embodiments, the invoice merchant can input the request for invoice directly into the invoice system 112. In such embodiments, the invoice system 112 can be, for example, an application executing on a computing device, which can be the POS system 130. The application, in this example, can communicate with the PSS 110 via an Application Program Interface (API).

The invoice system 112 generates the invoice 114 by incorporating the information received from the POS system 130, the PSS 110, and/or directly from the invoice merchant. In particular, the invoice system 112 generates the invoice 114 by including the transaction data in the invoice 114. The invoice system 112 can also determine and generate a list of one or more merchants to include in the invoice 114. The one or more merchants are recommended merchants with which the user 102 can make payment for the invoice 114. The invoice system 112 can determine the list of merchants based on a spending trend of the user 102, past transactions of the user 102, a geographical location of the user 102, and/or a combination thereof. For example, the list can include a boutique clothing store identified based on a spending trend of the user 102, a café (e.g., the merchant 122) identified based on a past transaction conducted at the POS system 120 (e.g., the user 102 is a regular customer at Bee Café), and another merchant located within 5 miles of an address associated with the user 102 (e.g., mailing address).

The merchant(s) identified based on a geographical location can be located within a specified distance of the address associated with the user 102. The specified distance can be configured, or specified, by the invoice system 112. In some embodiments, the specified distance can be specified by the identified merchants themselves. For example, the identified merchants can submit a request to the PSS 110 to be placed in any invoice(s) of customers that are located within 5 miles of these merchants. In some embodiments, the specified distance can be specified by the invoice merchant. For example, the invoice merchant (e.g., fitness club) can submit request to the PSS 110 that only specific merchants with whom the invoice merchant have a special business relationship and/or offer complementary services or products (e.g., fitness equipment) are to be included in the invoice(s).

Upon completion, the invoice system 112 transmits the generated invoice 114 back to the PSS 110 for transmission to the POS system 130. Alternatively, the invoice system 112 can directly transmit the generated invoice 114 to the POS system 130. In some embodiments, where the invoice system 112 is executing on the POS system 130, the invoice 114 is displayed at the POS system 130.

The POS system 130, upon receiving the invoice 114, can present it to the user 102 in numerous ways. For example, the POS system 130 causes a physical copy of the invoice 114 to be printed out for the user 102. In another example, the POS system 130 presents a "virtual" copy of the invoice 114 on the display 126 of the POS system 130. In some embodiments, the POS system 130 can present it to the user 102 through an electronic message. For example the POS system 130 prompts the user 102 whether he/she wishes to receive an electronic copy of the invoice 114, and requests an electronic address (e.g., an email address or a phone number) for transmission of such copy. Upon receiving that electronic address, the POS system 130 can cause the invoice to be transmitted to the user 102 for viewing at the user device 106.

In some embodiments, the POS system 130 itself transmits the invoice 114 responsive to receiving the electronic address. In other embodiments, the POS system 130 forwards the received electronic address to the invoice system 112, which transmits the generated invoice 114 to the user device 106. For example, the invoice 114 can be transmitted as an email message or a text message using an email address or phone number (i.e., electronic addresses). In some embodiments, the invoice system 112 can also transmit the invoice 114 to the user device 106 using the email address and/or the phone number submitted for creating the invoice 114 (as discussed above). For example, the invoice 114 is transmitted as an email message to an email account of the user 102.

In some embodiments, the invoice system 112 transmits the generated invoice 114 to the PSS 110. The PSS 110 can store the generated invoice 114 in association with one or more customer identifiers of the user 102. The customer identifiers can be those submitted to the POS system 130 and/or the invoice system 112 in the request to generate an invoice. The association between the customer identifier(s) and the invoice 114 can be stored in a database associated with the PSS 110.

In one example, the PSS 110 stores the phone number of the user 102 in association with the invoice 114, and further stores that phone number in association with the email address. In another example, the PSS 110 stores the email address of the user 102 in association with the invoice 114, and further stores that email address in association with the card number of the payment card 104. In yet another example, the PSS 110 stores the card number of the payment card 104 in association with the invoice 114. As discussed above in reference to FIG. 1, the one or more stored associations can be used for identification of any invoice(s) associated with a particular consumer, where the particular customer can be automatically notified of the identified invoice(s) when conducting a transaction (e.g., transaction 150) with a POS merchant at a POS system associated with the PSS 110. The POS merchant can be the same merchant (i.e., the invoice merchant) using the same POS system (e.g., POS system 130) or a different POS system. The POS merchant can also be a different, second merchant (e.g., merchant 122) using a different POS system (e.g., POS system 120).

Figure 3A:
FIGS. 3A-3B are example graphical user interfaces generated by a merchant POS system based on automatic invoice identification.
Figure 3B:
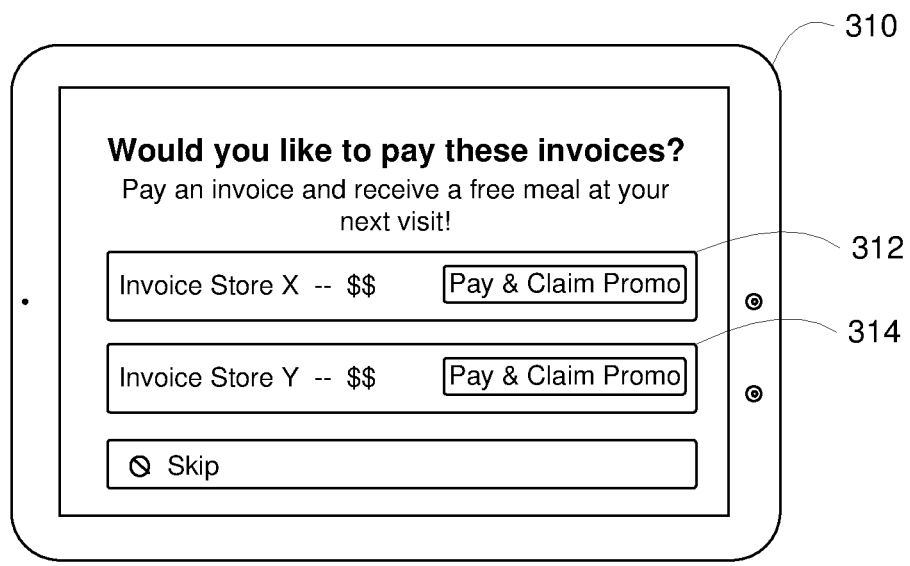

FIGS. 3A-3B are example graphical user interfaces generated by a merchant POS system based on the invoice technology. In some embodiments, the GUIs can be generated by the POS system 120 of FIG. 1. In some embodiments, the GUIs can be generated by the GUI generation module 512 of FIG. 5. FIG. 3A illustrates an example GUI 300 prompting a customer to input a phone number 302 or an email address 304 at which to receive an electronic receipt for a transaction conducted at the merchant POS system. The phone number 302 and the email address 304 can each be stored as a customer identifier of the customer for use in other transactions.

FIG. 3B illustrates an example GUI 310 notifying the customer of two invoices 312, 314 that have been identified for the customer. These invoices 312, 314 can be identified based on the phone number 302 and/or the email address 304 inputted in GUI 300. In some embodiments, the invoices 312, 314 can also be identified based on payment card data received in the transaction with the customer. The customer can choose to authorize payment for a particular invoice by interacting (e.g., click or touch) with an action button included in the GUI 310 (e.g., "Pay & Claim Promo" action button). For example, the customer can pay for the invoice with "Store X" and receive a free meal at Bee Café in exchange for that payment.

Figures 4A, 4B:
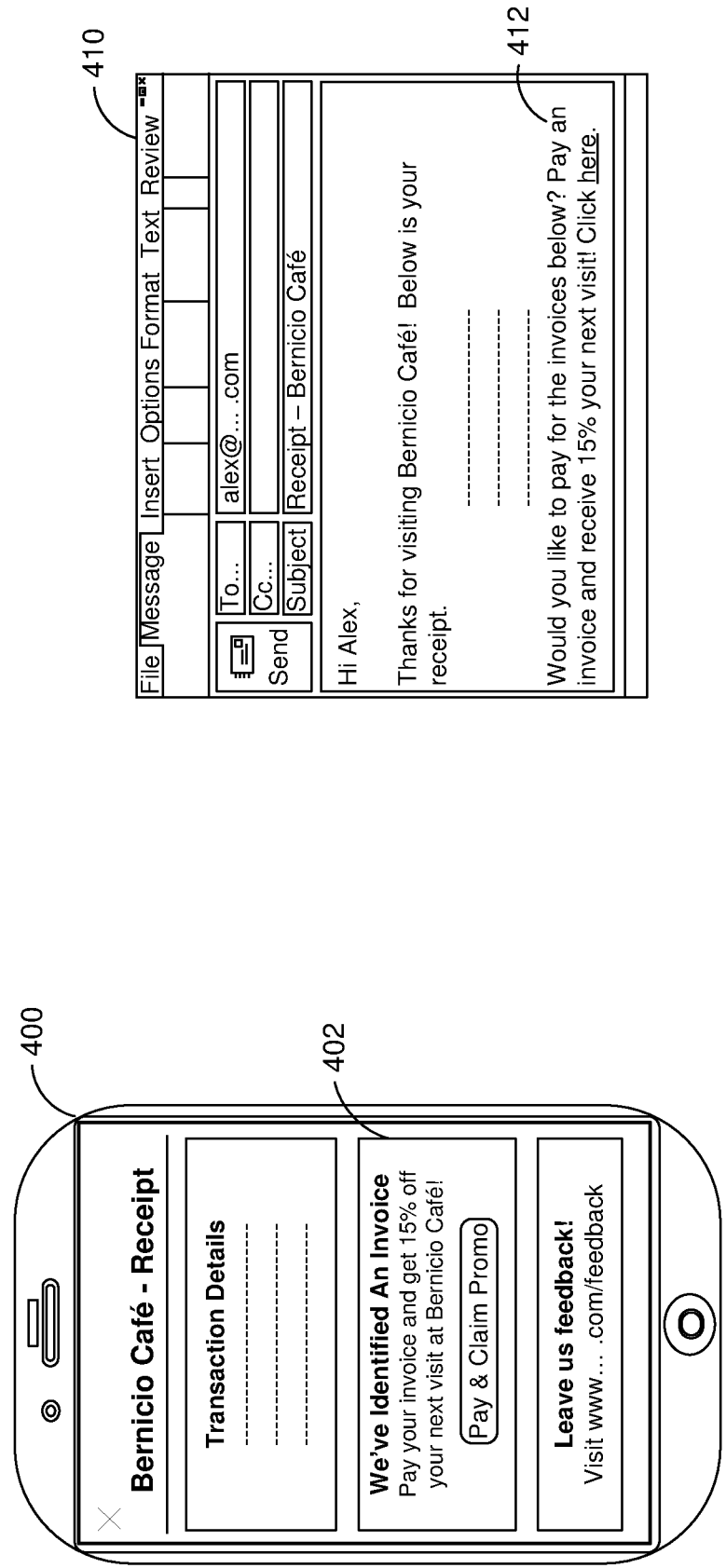
FIGS. 4A-4B are example graphical user interfaces generated by a user device based on automatic invoice identification.

FIGS. 4A-4B are example graphical user interfaces generated by a user device based on automatic invoice identification in accordance with various embodiments of the disclosed technology. In some embodiments, the GUIs can be generated by the user device 106 of FIG. 1 or 2. In some embodiments, the GUIs can be generated by the GUI generation module 512 of FIG. 5. FIG. 4A illustrates an example GUI 400 showing an electronic receipt in the form of an application executing on a mobile computing device of a customer. The electronic receipt can be transmitted to the application via an API associated with a receipt generation system. The receipt generation system can be a part of, or associated with, the PSS. The customer can pay for an identified invoice included in the receipt by interacting with an action link 402. FIG. 4B illustrates an example GUI 410 showing an electronic receipt in the form of an email message generated by an email application executing on the mobile computing device of the customer. The email message has been transmitted (e.g., by a receipt generation system, which can be a part of, or associated with, the PSS) to an email account of the customer, and can be displayed by the email application for viewing at the mobile computing device. The customer can pay for the identified invoice included in the receipt by interacting with an action link 412 included in the email message.

Figure 5:
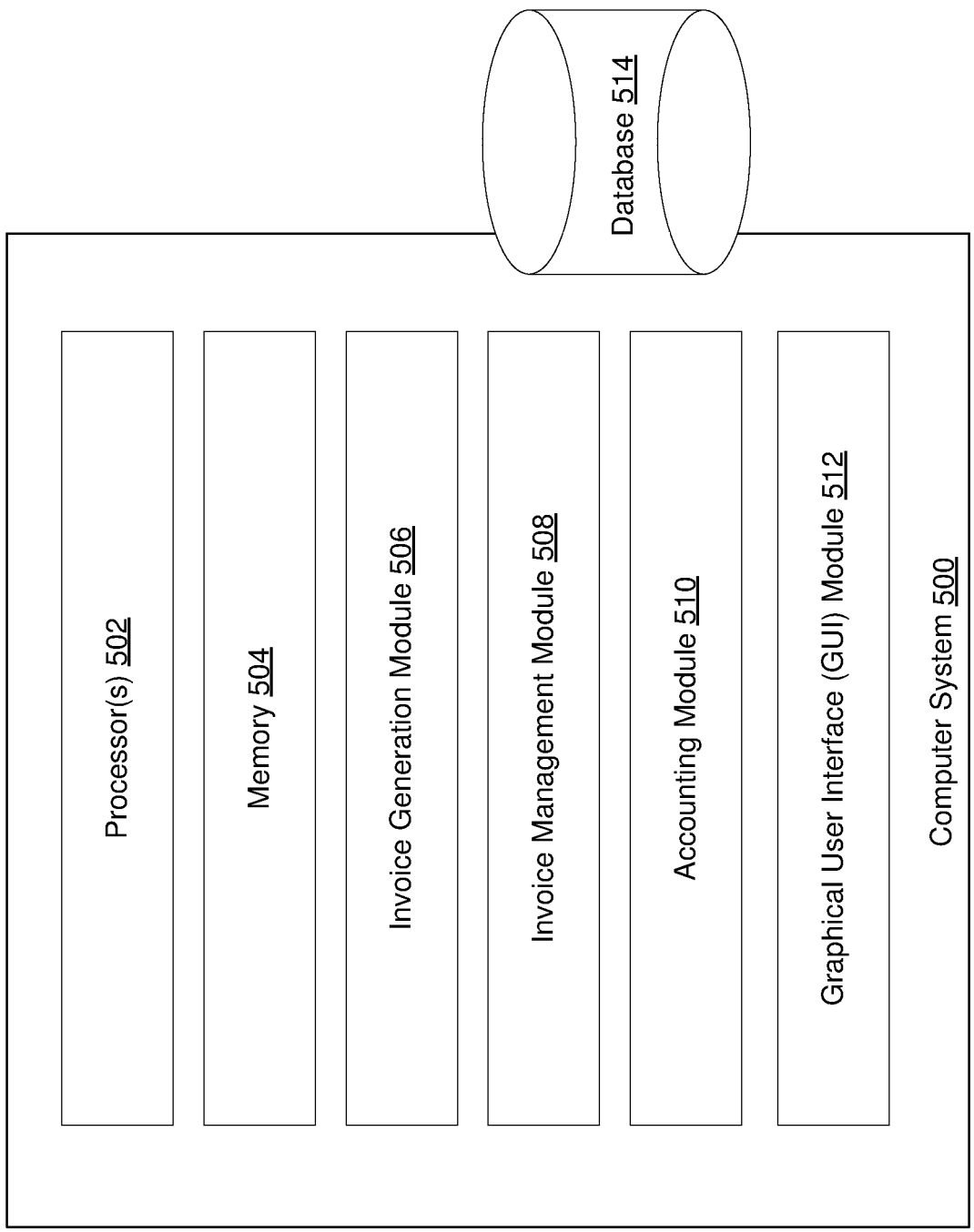
FIG. 5 illustrates various components of a payment service system.

FIG. 5 illustrates various components of a payment service system 500 that can be utilized in various embodiments of the invoice technology. In some embodiments, the payment service system 500 can be the PSS 110 of FIG. 1. As illustrated in FIG. 5, the payment service system 500 can include one or more processors 502, memory 504, an invoice generation module 506, an invoice management module 508, a financial module 510, and a graphical user interface (GUI) generation module 512. Other embodiments of the invoice technology can include some, all, or none of these modules and components along with other modules, applications, and/or components. Still yet, some embodiments can incorporate two or more of these modules and components into a single module and/or associate a portion of the functionality of one or more of these modules with a different module. For example, in some embodiments, the invoice generation module 506 and the invoice management module 508 can be combined into a single component for generating an invoice and identifying invoice(s) associated with a user.

The memory 504 can be any device, mechanism, or populated data structure used for storing information. In some embodiments of the invoice technology, the memory 504 can be or include any type of, but is not limited to, volatile memory, nonvolatile memory and dynamic memory. The memory 504 can be or include one or more disk drives, flash drives, one or more databases, and/or the like. The memory 504 can also include one or more tables, one or more files, local cache memories, processor cache memories, relational databases, and/or the like. In some embodiments, the memory 504 can be used to store instructions for executing, or running, one or more applications or modules on the processor(s) 502. For example, the memory 504 could be used in various embodiments to house all or some of the instructions needed to execute the functionality of the invoice generation module 506 and/or the invoice management module 508.

The invoice generation module 506 is coupled to the processor(s) 502 and configured to receive, from a merchant point-of-sale (POS) system, a request to generate an invoice for a particular transaction. The particular transaction can be initiated at the merchant POS system between a customer (e.g., user 102 of FIG. 1) and a first merchant. The request to generate the invoice can include a particular customer identifier associated with the customer. As discussed above, the particular customer identifier can include, for example, an email address, a telephone number, a payment card number, or any combination thereof.

In some embodiments, the request to generate the invoice can be submitted to the merchant POS system via an invoice system (e.g., invoice system 112 of FIG. 2) in the form of an application executing on the merchant POS system, where the application communicates with a PSS (e.g., PSS 110 of FIG. 1) via an API. In other embodiments, the request to generate the invoice can be submitted via the invoice system in the form of a website that is accessible by a web browser executing on a computing device of a user merchant (e.g., a smart-phone). The website is associated with the PSS and is operatively coupled to communicate with the PSS via a wireless or wired communications network. In yet other embodiments, the request to generate the invoice can be submitted via a customized client executing on the computing device of the user merchant. The customized client can communicate with the PSS via a wired or wireless communications network using an API. Alternatively, the customized client and the PSS can be implemented in the same computing device.

The invoice generation module 506 is configured to access, based on the customer identifier included in the request for invoice, first association data to identify a set of one or more transactions that are associated with the particular customer identifier. In particular, the first association data specifies a first set of associations between customer identifiers of all users of the computer system 500 and all corresponding transactions conducted by those users. Accessing the first association data to identify the set of transactions can include performing a search (e.g., SQL query) in a database for any transaction(s) that are associated with the particular customer identifier.

The invoice generation module 506 is configured to identify, based on the set of transactions associated with the particular customer identifier, a set of one or more merchants that correspond to that set of transactions. The set of merchants are those merchants at which the customer (identified based on the particular customer identifier) has conducted transactions in the past. In some embodiments, the merchants identified in the set can be filtered based on a frequency of visits (e.g., a number of transactions), a recentness of visits (e.g., transactions conducted within the last week), or a combination thereof (e.g., number of transactions within the last week). In some embodiments, the merchants identified in the set can be further filtered based on a number of merchants to be included. For example, Bee Café and Corner Laundromat are the top two merchants at which the customer has conducted the largest number of transactions in the last week, are identified for the set of merchants.

Using the identified set of merchants, the invoice generation module 506 is configured to generate the invoice for the particular transaction initiated at the POS system, as requested. In particular, the invoice generation module 506 generates an invoice that includes a recommendation of the identified set of merchants to notify the customer that the generated invoice can be paid at these merchants. In some embodiments, the invoice generation module 506 is configured to store, in a database, the generated invoice in association with the particular customer identifier of the customer (e.g., transmitting to a database server and/or storing at a local database). Such storing of the invoice in association with the particular customer identifier can enable identification of the invoice in a later transaction at which the same customer (i.e., same particular customer identifier) conducts with the merchant and/or a different merchant.

The invoice management module 508 is coupled to the processor(s) 502 and is configured to receive transaction data from a merchant POS system for another transaction ("second transaction") initiated at the merchant POS system ("second POS system"). The second POS system can be the same POS system discussed above in reference to the invoice generation module 506, or a different POS system. For example, the second POS system is a POS system of the same merchant (as discussed in reference to the invoice generation module 506), but is located at a different business location of the merchant. In another example, the second POS system is a POS system of a different merchant; for example, the merchant discussed here can be the Corner Laundromat and the other merchant discussed in reference to the invoice generation module 506 is a fitness club.

The transaction data received from the second POS system can include a customer identifier that is the same as the particular customer identifier that identifies the same customer discussed above. Upon receiving this customer identifier, the invoice management module 508 is configured to access a database to find second association data for identifying any invoice(s) that are associated with the customer identifier. In particular, the second association data specifies a second set of associations between customer identifiers of all users of the computer system 500 and all corresponding invoices. For example, one customer identifier is associated with three invoices. In another example, another customer identifier is associated with only one invoice. Accessing the second association data to identify the invoice(s) can include performing a search (e.g., SQL query) in a database for any invoice(s) that are associated with the customer identifier in the transaction data associated with the second transaction. The invoice management module 508, for example, identifies the invoice generated by the invoice generation module 506 discussed above.

Upon finding an invoice, the invoice management module 508 is configured to generate an invoice payment invitation for that invoice. The invoice payment invitation can include a promotion to provide an incentive to the customer to pay the invoice. The promotion can include a discount for a transaction item available for purchase from the merchant associated with the second POS system. For example, the promotion is a 30% discount for laundry service in exchange for payment of the invoice of membership fee with the fitness club.

In some embodiments, the invoice management module 508 is configured to receive, from the second POS system, invoice payment information that indicates a payment for the invoice has been authorized at the second POS system. The invoice payment can be paid via authorization by the customer at the second POS system. An example of a GUI illustrating an option for the customer to pay the invoice (and claim an associated promotion) is shown in FIG. 3B. As discussed above, the invoice payment invitation can be displayed (or output in another manner) at the second POS system, or at a computing device of the customer. Accordingly, the invoice payment can be paid using either the second POS system or the computing device of the customer.

In some embodiments, the invoice management module 508 is configured to transmit a notification of the invoice payment to the POS system of the invoice merchant (e.g., the first POS system discussed above in reference to the invoice generation module 506. The invoice management module 508 can also be configured to transmit the notification of the invoice payment to a computing device of the customer.

The financial module 510 can be used to track financial transactions. For example, in some embodiments, the PSS 110 (FIG. 1) facilitates the transfer of funds between various merchants using the invoice technology. For example, the PSS 110 ensures that compensation payment(s) from an invoice merchant to a participating merchant (i.e., the merchant providing the promotion to provide an incentive to invoice payment(s)) are properly deducted and credited. In other embodiments, the financial module 510 charges a fee from the various merchants for utilizing the invoice technology. In yet other embodiments, the financial module 510 processes payments (i.e., funds transfers) for transactions conducted by the various merchants with their respective customers. For example, the financial module 510 ensures that credit cards are properly charged for services and/or goods provided by the merchants to their respective customers.

The GUI generation module 512 generates one or more GUI screens that enable interaction with a user of the computer system 500. In some embodiments, GUI generation module 512 generates a GUI screen enabling a user of the computer system 500 to set preferences, authentication standards, and/or passcodes, set rules, set constraints, customize messages, and/or otherwise receive or convey information to the user. For example, the GUI generation module 512 generates a GUI that enables an operator of the PSS 110 (FIG. 1) to configure the type of merchants that are identified for inclusion in an invoice.

In some embodiments, GUI generation module 512 generates a GUI screen enabling a user of the computer system 500 to interact with the computer system 500 for executing various functionalities. For example, the GUI generation module 512 generates one or more GUIs for display within an invoice application (e.g., invoice system 112 of FIG. 2) executing on a computing device. In another example, the GUI generation module 512 generates one or more GUIs for display within an application (e.g., a payment service application) executing on the POS system 120 (FIG. 1) for processing payments. An example of such a GUI is shown in FIG. 3A for prompting a customer how he/she would like to receive a receipt for a transaction executed at a POS system. Another example of such a GUI is shown in FIG. 3B for inviting a customer to pay an invoice and claim a promotion associated with that invoice payment.

The database 514 is configured to maintain data for facilitating the processing of invoices and/or transactions and/or other functionalities of the computer system 500. The data can include, for example, transaction data, information related to invoices, financial account data (e.g., credit card or debit card numbers), user account data (e.g., email addresses, phone numbers, addresses, biometric information, etc.), or the like. The data can be stored in association with one another in the database 514, which can be, for example, a relational database. The database 514 can include, for example, one or more hard drives (which may be further coupled together using RAID-0, 1, 5, 10, etc.), a centralized or distributed data cluster, a cloud-storage service provider, or other suitable storage systems suitable for storing digital data.

FIG. 6 illustrates example database tables that can be utilized with the invoice technology. The embodiments of FIG. 6 includes an example database table 600 and an example database table 602, both of which can be stored in the database 514 (FIG. 5). The database table 600 can include various fields of data, or information, such as, but not limited to: customer ID1 (e.g., invoice record number or name); customer ID2 (e.g., email address); customer ID3 (e.g., phone number); first name; last name; billing address; and/or the like. The database table 602 can include various fields of data, or information, such as, but not limited to: customer ID2 (e.g., email address), customer ID4 (e.g., credit or debit card number), or a combination thereof; card issuer; card expiration date; billing address; and/or the like.

Figure 7:
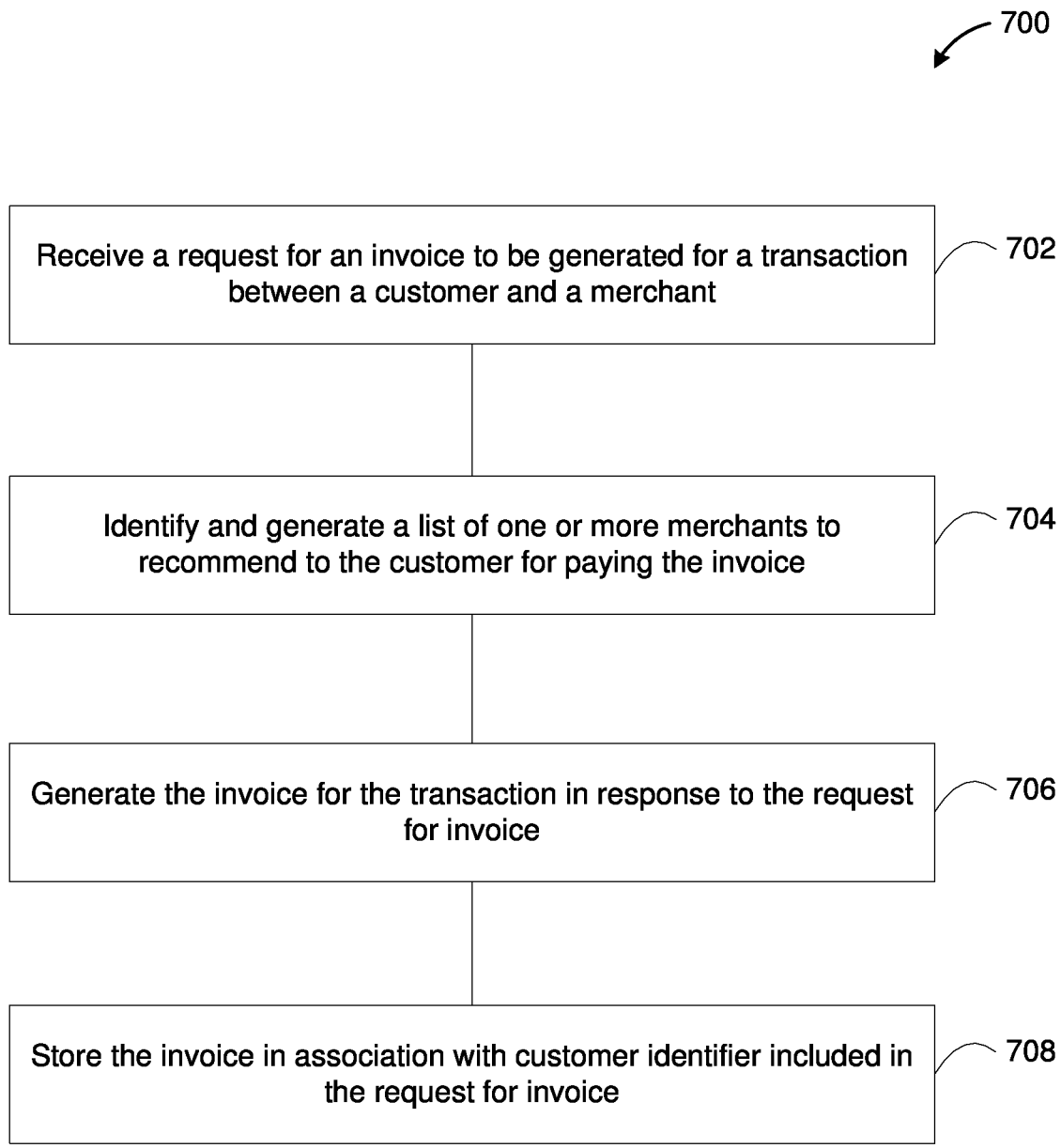
FIG. 7 is a flowchart illustrating a set of operations for generating an invoice with recommended merchants for paying the invoice.

FIG. 7 is a flowchart illustrating a set of operations 700 for generating an invoice with recommended merchants for paying the invoice. In some embodiments, the set of operations 700 can be executed by the PSS. In other embodiments, the set of operations 700 can be executed by in invoice system executing on a POS system, where the invoice system communicates with the PSS via an API. In yet other embodiments, the POS system can be a mobile computing device, such as a smart-phone or a tablet.

At operation 702, a request is received to generate an invoice between a customer and a merchant (i.e., invoice merchant). The request can be received from a merchant POS system. The request can include transaction information associated with the transaction between the customer and the invoice merchant. The transaction information can include, for example, customer information (e.g., billing address, shipping address, service address such as where the customer lives and uses the purchased service, customer name, customer identifiers such as phone number or email address, etc.), transaction amount, item-level transaction data (e.g., information about item description, price, quantity, etc.), invoice payment due date, among others. In some embodiments, payment card information (including a card number) is also received in the request to generate the invoice.

At operation 704, one or more merchants are identified as recommendations at which the customer to pay the invoice. The merchant(s) can be identified based on past transactions conducted by the customer, spending trend of the customer, and/or a geographical location associated with the customer. For example, a merchant geographically located within a specified distance from a billing address of the customer is identified. In another example, a merchant geographically located within a specified distance from a service address at which the service is rendered for the customer is identified. In yet another example, a merchant geographically located within a specified distance from the invoice merchant itself is identified.

In some embodiments, the merchants identified can also be filtered based on various criteria. The various criteria can include, for example, a maximum number of merchants, a frequency of visits by the customer, a recentness of visits by the customer. In some embodiments, the merchants identified can be prioritized based on a business relationship with the system. For example, merchant X engages in a business relationship to pay a fee for being listed on all invoices generated for customers, as a form of advertisement to encourage customers to visit merchant X. All of the identified merchants are then generated as a list for inclusion in the invoice to be generated.

At operation 706, the invoice is generated to include the list of one or more merchants and at least some of the transaction data received in the request for invoice. For example, the invoice includes item-level data associated with the service or product purchased in the transaction, and two merchants located within 5 miles from the invoice merchant. The generated invoice can be transmitted to the POS system of the invoice merchant for printing, displayed electronically at the POS system, or transmitted electronically for viewing by the customer.

At operation 708, the generated invoice is stored in association with a customer identifier of the customer. The customer identifier can be part of the customer information received in the request for invoice. The customer identifier can be, for example, a phone number or an email address. As discussed above in reference to FIG. 1, the stored association can be used for identification of the generated invoice to automatically notify the customer whenever he/she conducts another transaction with a POS merchant at a POS system associated with the PSS 110. The POS merchant can be the same merchant (i.e., the invoice merchant) using the same POS system or a different POS system. The POS merchant can also be a different, second merchant (e.g., merchant 122) using a different POS system (e.g., POS system 120).

Figure 8:
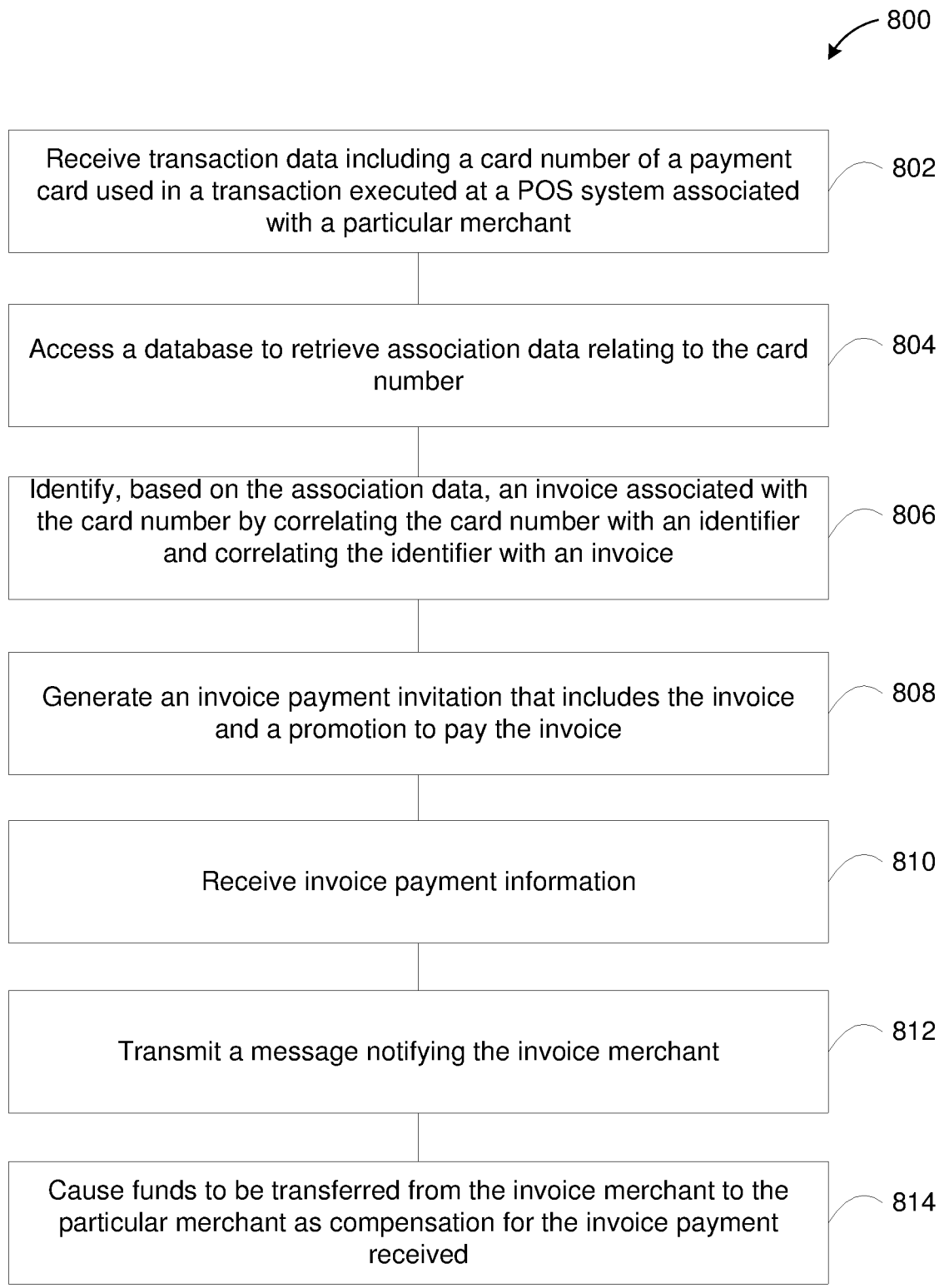
FIG. 8 is a flowchart illustrating a set of operations for identification and notification of invoice(s) based on received transaction data.

FIG. 8 is a flowchart illustrating a set of operations 800 for identification and notification of invoice(s) based on received transaction data. In some embodiments, the set of operations 800 can be executed by the PSS.

At operation 802, transaction data is received from a POS system associated with a POS merchant for a transaction between the POS merchant and a customer. The transaction data can include a card number for the transaction, where the card number is an identifier associated with the customer. In some embodiments, the transaction data can also include another identifier associated with the customer, such as an email address or a phone number. In such embodiments, the email address or phone number can be received as part of a receipt delivery process, where the email address or phone number is an electronic address provided by the customer for receiving the receipt for the transaction with the POS merchant.

At operation 804, a database is accessed to retrieve association data relating to the card number included in the transaction data received from the POS system. At operation 806, an invoice associated with the card number is identified using the association data retrieved from the database. In particular, the invoice is identified by correlating the card number with an identifier and correlating that identifier with one or more invoice(s). In one example, an invoice is identified by finding a match between the card number (included in the transaction data) and a card number of a particular payment card that stored in association with an invoice. In another example, the invoice is identified based on the invoice's association with the email address, which is stored in association with the card number.

At operation 808, an invoice payment invitation is generated based on the identified invoice. Generating the invoice payment invitation can include generating a promotion for inclusion in the invoice payment invitation to provide an incentive to the customer to pay the invoice. The promotion can be preconfigured, or specified, by the POS merchant involved in the transaction of FIG. 8. For example, the POS merchant specifies that the promotion is to be offered for inventory items that are slow to sell and/or in excess in order to improve business. In another example, the POS merchant specifies that the promotion is to be offered for discounts associated with particular days of the week and/or times of the day that experience low customer visits. In yet another example, the POS merchant specifies that the promotion has a maximum promotional value (e.g., available only for $5 items or $50 items, or maximum discount of $10 off.). As discussed above, the payment invoice invitation can be displayed at the POS system or at a user device belonging to the customer.

At operation 810, invoice payment information is received to indicate that an invoice payment has been submitted by the customer. At operation 812, a message is transmitted to the invoice merchant to notify the invoice merchant of the invoice payment (e.g., POS system associated with the invoice or another computing device associated with the invoice merchant). At operation 814, funds are caused to be transferred from the invoice merchant to the POS merchant as a compensation payment (e.g., reimbursement) for the POS merchant in exchange for the invoice payment received. In some embodiments, causing the funds to be transfer can include communicating with card payment networks (e.g., credit card or debit card payment networks) of the corresponding merchants to request for funds transfer.

Regarding the sets of operations 700 and 800, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

Figure 9:
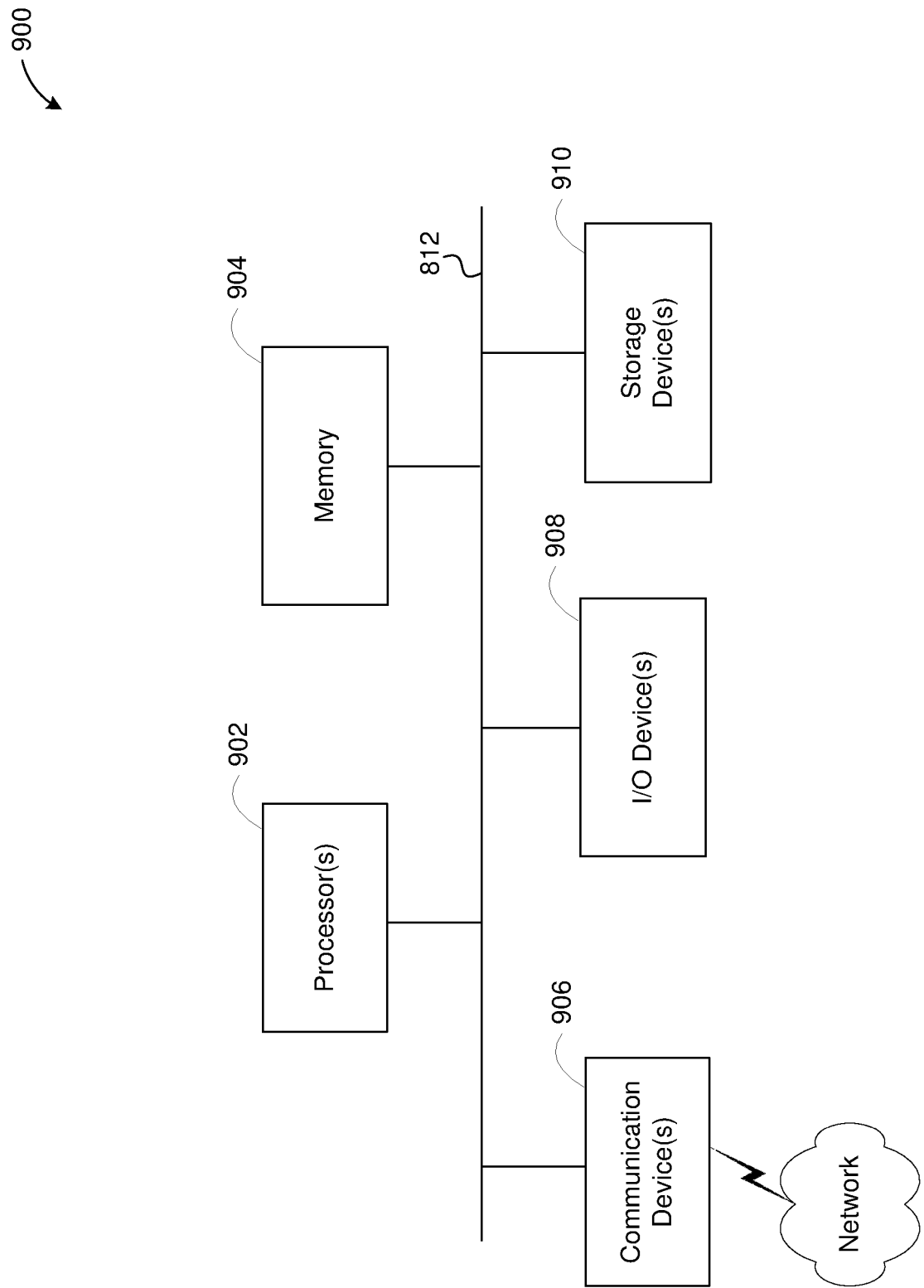
FIG. 9 illustrates an example of a processing computer system with which various embodiments of the invoice technology can be utilized.

FIG. 9 illustrates an example of a processing computer system 900 that can be used to implement any of the computing devices referred to above, such as a user device, the POS system, the PSS, etc. Any of these devices each can include multiple instances of an architecture such as shown in FIG. 9 (i.e., multiple computers), particularly server-based systems, and such multiple instances can be coupled to each other via one or more networks.

In the illustrated embodiments of FIG. 9, the processing system 900 includes one or more processors 902, memory 904, one or more communication device(s) 906, one or more input/output (I/O) devices 908, and one or more mass storage devices 910, all of which are coupled to one another through an interconnect 912. The interconnect 912 may be or include one or more buses, point-to-point connections, controllers, adapters and/or other conventional connection devices.

The processor(s) 902 can be or include, for example, one or more general-purpose programmable microprocessors, digital signal processors (DSPs), microcontrollers, application specific integrated circuits (ASICs), programmable gate arrays, or the like, or a combination of such devices. The processor(s) 902 control the overall operation of the processing device 900.

Memory 904 can be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device(s) 910 may be or include one or more hard drives, digital versatile disks (DVDs), flash memories, or the like. The memory 904 and/or the mass storage device(s) 910 can store (individually or collectively) data and instructions that configure the processor(s) 902 to execute operations in accordance with the techniques described above.

The communication devices 906 can be or include, for example, an Ethernet adapter, cable modem, Wi-Fi adapter, cellular transceiver, Bluetooth or Bluetooth Low Energy (BLE) transceiver, or the like, or a combination thereof. For example, in the case of a client device, the communication devices 906 can be or include, for example, a cellular telecommunications transceiver (e.g., 3G or 4G/LTE), Wi-Fi transceiver, Bluetooth or BLE transceiver, or the like, or a combination thereof.

Depending on the specific nature and purpose of the processing device 900, the I/O devices 908 can include devices such as a display (which may be a touch screen display), audio speaker, keyboard, mouse or other pointing device, microphone, camera, etc. Note that these I/O devices may be unnecessary, however, if the processing device 900 is embodied solely as a server computer.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

What is claimed is:

1. A method comprising:
   receiving, by one or more servers of a payment service and from a first point-of-sale (POS) device associated with a first merchant via a network, an indication of an unpaid invoice for a first transaction conducted at the first POS device between a customer and the first merchant, the unpaid invoice associated with a customer identifier;
   storing, by the one or more servers and in a database, the indication of the unpaid invoice;
   receiving, by the one or more servers and from a second point-of-sale (POS) device associated with a second merchant different from the first merchant, via the network, transaction data for a second transaction occurring at the second POS device between the customer and the second merchant, the transaction data including the customer identifier, wherein the second merchant is different from the first merchant;
   at least partly responsive to receiving the transaction data and based at least in part on the customer identifier, identifying, in the database and by the one or more servers, the unpaid invoice;
   generating, by the one or more servers, a customer notification after completion of the second transaction, wherein the customer notification includes an invitation to pay the unpaid invoice;
   causing presentation, by the one or more servers, of the customer notification on at least one of a display of the second POS device or a display of a customer device associated with the customer; and
   based at least in part on payment of the unpaid invoice, sending, by the one or more servers, a merchant notification to the second merchant that the invoice has been paid.

2. The method of claim 1, wherein the transaction data comprises first transaction data, the method further comprising:
   receiving second transaction data from a plurality of merchants,
   wherein identifying the unpaid invoice is further based at least in part on the second transaction data.

3. The method of claim 1, further comprising:
   receiving, from the second POS device, invoice payment information indicating that the customer submitted a payment on the unpaid invoice;
   transmitting, to the first POS device or another device associated with the first merchant, an indication that the customer submitted the payment; and
   causing a transfer of funds from the first merchant to the second merchant as a compensation to the second merchant for assistance of the second merchant to the first merchant in collecting the payment.

4. The method of claim 1, wherein the invitation to pay includes at least a name of the first merchant and an amount of the unpaid invoice.

5. The method of claim 1, wherein the customer notification comprises a digital receipt for the second transaction.

6. The method of claim 5, further comprising:
   transmitting the customer notification to the customer device by at least one of email or direct message.

7. The method of claim 1, wherein the customer notification includes a link, that upon activation, enables the customer to make a payment on the unpaid invoice.

8. The method of claim 1, wherein the invitation to pay the unpaid invoice includes an indication of a promotion available to the customer upon the customer submitting a payment on the unpaid invoice.

9. The method of claim 8, further comprising:
   receiving, from the second POS device, invoice payment information indicating that the customer submitted a payment on the unpaid invoice; and
   sending, to the customer device, a notification that the promotion is available to the customer.

10. The method of claim 1, further comprising:
    based at least in part on the transaction data, identifying one or more other unpaid invoices associated with the customer identifier; and
    causing presentation of, on at least one of the display of the second POS device or the display of the customer device, one or more additional invitations for the customer to pay the one or more other unpaid invoices.

11. The method of claim 1, further comprising:
    receiving an indication of a customer request to pay the unpaid invoice; and
    based at least in part on the indication of the customer request to pay the unpaid invoice, causing funds to be transferred from an account associated with the customer to the account associated with the first merchant.

12. The method of claim 1, further comprising:
    determining that the customer has paid the unpaid invoice; and
    causing a transfer of funds from an account associated with the first merchant to an account associated with the second merchant as compensation for receiving a payment from the customer on the unpaid invoice.

13. The method of claim 1, wherein receiving the transaction data from the second POS device comprises receiving the transaction data from a merchant support application executing on the second POS device.

14. A system comprising:
    one or more processors;
    a database accessible to the one or more processors and configured to store a plurality of invoices associated with individual merchants of a plurality of merchants; and
    one or more non-transitory computer-readable media storing computer-executable instructions that, when executed by the one or more processors, cause the one or more processors to perform acts comprising:
      receiving, by one or more servers of a payment service and from a first point-of-sale (POS) device associated with a first merchant via a network, an indication of unpaid invoice for a first transaction conducted at the first POS device between a customer and the first merchant, the unpaid invoice associated with a customer identifier;

storing, by the one or more servers and in the database, the indication of the unpaid invoice;

receiving, by the one or more servers and from a merchant point-of-sale (POS) device of a second merchant of the plurality of merchants, transaction data for a second transaction occurring at the second POS device between the customer and the second merchant, the transaction data including the customer identifier;

at least partly responsive to receiving the transaction data and based at least in part on the customer identifier, analyzing the transaction data to identify, by the one or more servers, the unpaid invoice;

generating, by the one or more servers, a customer notification after completion of the second transaction, wherein the customer notification includes an invitation to pay the unpaid invoice;

causing presentation, by the one or more servers, of the customer notification on at least one of a display of the second POS device or a display of a customer device associated with the customer; and based at least in part on payment of the unpaid invoice, sending, by the one or more servers, a merchant notification to the second merchant that the invoice has been paid.

15. The system of claim 14, wherein the customer notification comprises a digital receipt for the second transaction.

16. The system of claim 14, wherein the customer notification includes a link, that upon activation, enables the customer to make a payment on the unpaid invoice.

17. The system of claim 14, the acts further comprising:
based at least in part on the transaction data, identifying one or more other unpaid invoices associated with the customer identifier; and
causing presentation of, on at least one of the display of the second POS device or the display of the customer device, one or more additional invitations for the customer to pay the one or more other unpaid invoices.

18. The system of claim 14, wherein causing presentation of the invitation comprises displaying an image of the unpaid invoice or information from the unpaid invoice.

19. The system of claim 14, wherein receiving the transaction data from the second POS device comprises receiving the transaction data from a merchant support application executing on the second POS device.

20. The system of claim 14, wherein the transaction data includes an item-level description identifying an item that is a subject of the second transaction.

* * * * *